Sept. 13, 1966 W. P. SCHMITTER ET AL 3,273,000

VARIABLE SPEED THRU-MOTOR DRIVE

Filed Jan. 8, 1963 3 Sheets-Sheet 1

INVENTORS
DAVID G. BERNARD and
WALTER P. SCHMITTER, DECEASED
BY A. LOUISE SCHMITTER
ROBERT V. ABENDROTH,
CO-EXECUTORS BY Thomas W. Ehrmann

ATTORNEY

VARIABLE SPEED THRU-MOTOR DRIVE

INVENTORS
DAVID G. BERNARD and
WALTER P. SCHMITTER, DECEASED
BY A. LOUISE SCHMITTER
ROBERT V. ABENDROTH,
CO-EXECUTORS BY Thomas W. Ehrmann

ATTORNEY

INVENTORS
DAVID G. BERNARD and
WALTER P. SCHMITTER, DECEASED
BY A. LOUISE SCHMITTER
ROBERT V. ABENDROTH,
CO-EXECUTORS BY Thomas W. Ehrmann

ATTORNEY 3,273,000

VARIABLE SPEED THRU-MOTOR DRIVE

Walter P. Schmitter, deceased, late of Wauwatosa, Wis., by A. Louise Schmitter, Wauwatosa, Wis., and Robert V. Abendroth, Whitefish Bay, Wis., co-executors, and David G. Bernard, Milwaukee, Wis., assignors to The Falk Corporation, Milwaukee, Wis., a corporation of Wisconsin Filed Jan. 8, 1963, Ser. No. 250,189
6 Claims. (Cl. 310—98)

This invention relates to power drives, and particularly to a compact, unitary variable speed power drive including a driving motor, an electromagnetic slip coupling, and reduction gearing all disposed about a driven shaft which has its output end at the motor end of the drive, the speed of such driven shaft being variable by control of the degree of slip in the slip coupling.

Electromagnetic slip couplings have been employed between a driving motor and an apparatus to be driven to permit control and adjustment of the speed of the input to the driven apparatus. Gear reduction units have also been incorporated in such variable speed control systems and this has been accomplished by simply assembling the various units in a straight line relation thereby feeding from the driving motor to the electromagnetic slip coupling and thence through the gear reduction unit to the driven apparatus. Control of the speed of the input to the driven apparatus is effected by controlling the amount of slip in the electromagnetic coupling. Such units have heretofore been quite bulky and have demanded considerable space for their assembly and mounting in relation to the driven apparatus.

It is a principal object of this invention to provide within a single compact, unitary assembly a variable speed power drive which includes a driving motor, an electromagnetic slip coupling, and reduction gearing, and which variable speed power drive is adapted for ready application to apparatus to be driven.

The reduction in the size and bulk of the power drive of this invention as compared with the prior art is accomplished in part by providing a hollow output shaft for the driving motor to which output shaft one of the pair of rotors comprising the electromagnetic slip coupling is mounted for rotation, and by mounting the second rotor of the slip coupling on a quill shaft coaxial with the hollow drive shaft and which quill shaft is provided with a driving pinion at one end which is the input to the reduction gearing. The driven output shaft extends back through the coaxial quill shaft and hollow motor drive shaft, and in this manner a compact thru-motor variable speed drive is formed of rigid and stable construction.

The power drive of this invention may further be provided with two speed ranges with the speed adjustment by the electromagnetic slip coupling being available within each range. This is accomplished by providing in combination with a reversible driving motor, a pair of concentric low speed gears having interior and exterior gear teeth which mesh with a driving pinion of the reduction gearing and with one way clutches mounting each of such gears upon the driven output shaft. The one way clutches are disposed to have the same free running direction relative to the driven output shaft whereby either one of the two speed ranges may be utilized by selecting the direction of rotation of the driving motor.

Accordingly, it is another object of this invention to provide a variable speed power drive including a driving motor, an electromagnetic slip coupling and reduction gearing and in which the driven output shaft of the power drive extends through the slip coupling and the driving motor.

It is a further object of this invention to provide such a power drive which is structurally rigid to maintain within close limits the critical working gap between the rotors of the slip coupling.

It is also an object of this invention to provide such a power drive which has two selectable speed ranges, the speed within each range being variable by a single electromagnetic slip coupling.

The foregoing and other objects and advantages of this invention will appear in the description to follow. In the description, reference is made to the accompanying drawings which form a part hereof and in which there is shown by way of illustration specific forms in which this invention may be practiced. These forms will be described in detail to enable those skilled in the art to practice this invention but it is to be understood that other embodiments of the invention may be used and that structural changes in the embodiment described may be made by those skilled in the art without departing from the true scope of the present invention. Consequently, the following detailed description is not to be taken in a limiting sense and the scope of the present invention is best defined by the appended claims.

Figure 1:
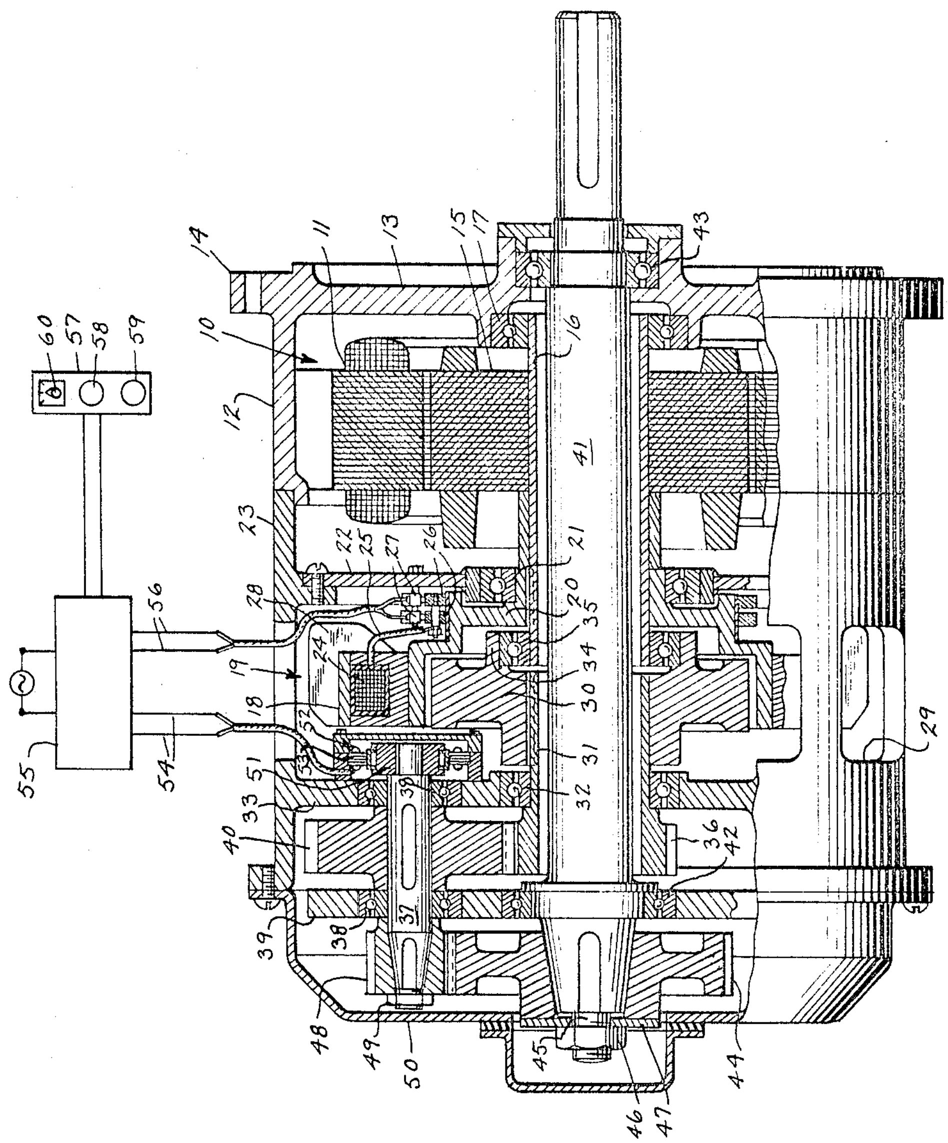
FIG. 1 is a vertical longitudinal view partially in section of a power drive constructed in accordance with the teachings of the present invention.

Referring to the embodiment of FIG. 1, an A.C. induction motor 10 has its stator and yoke assembly 11 rigidly mounted within a casing 12. The casing 12 has an end wall 13 having flanged extensions 14 provided with holes for mounting of the assembly on an apparatus to be driven. The rotor assembly 15 of the driving motor 10 is mounted on a hollow motor drive shaft 16 that is journaled at one end in an antifriction bearing 17 mounted in the end wall 13 of the casing 12.

A driving rotor 18 of an eddy current coupling 19 has a hub portion 20 which is keyed to the hollow drive shaft 16 whereby the driving rotor 18 will rotate with the hollow drive shaft 16 at the output speed of the driving motor 10. The hub portion 20 of the driving rotor 18 is journaled in an antifriction bearing 21 mounted in a partition wall 2 secured within a second casing 23. The second casing 23 is joined axially with casing 12 to form the basic housing for the power drive. The driving rotor 18 includes a rotary field coil 24 which is energized through leads 25 connecting the field coil 24 to a pair of collector rings 26 which are mounted upon a peripheral portion of the driving rotor 18 and are suitably insulated therefrom. A pair of brush assemblies 27, mounted on a rod supported by the partition wall 22, cooperate with the collector rings 26 to supply an exciting current to the field coil 24. The driving rotor 18 further includes a series of peripherally spaced vanes 28 forming a fan for cooling of the assembly, and the second casing 23 is provided with a series of peripheral ports 29 to permit the circulation of air.

A driven rotor 30 of the eddy current coupling 19 is keyed to a quill shaft 31 which is coaxial with and axially spaced from the hollow drive shaft 16. The quill shaft 31 is journaled in an antifriction bearing 32 mounted in a second partition 33 formed as an integral part of the second casing 23. The driven rotor 30 includes a portion 34 which is concentric with the end of the hollow drive shaft 16 that extends through the partition 22. An antifriction bearing 35 mounted on such end of the hollow drive shaft 16 supports the portion 34 of the driven rotor 30. A high speed pinion 36 is formed as an integral part of the outboard portion of the quill shaft 31 and is disposed within a cavity of the second casing 23 that lies adjacent the partition 33 and remote from the driving motor 10.

An intermediate shaft 37 is journaled in antifriction bearings 38 carried by the partition 33 and by a bearing support plate 39 that is removably secured to a flange formed on the casing 23. The intermediate shaft 37 is supported in parallel spaced relationship with the quill shaft 31 and the hollow drive shaft 16, and includes an inboard portion and an outboard portion at each end. An intermediate gear 40 is mounted upon the inboard portion of the intermediate shaft 37 and is in meshing engagement with the high speed pinion 36.

A driven output shaft 41 extends through the quill shaft 31 and the hollow drive shaft 16 and is journaled in an antifriction bearing 42 mounted in the bearing support 39 and a second antifriction bearing 43 mounted in the end wall 13 of the casing 12. As will be seen from FIG. 1, the output end of the driven shaft 41 extends beyond the housing at the motor end thereof for connection to apparatus to be driven. The opposite end of the driven shaft 41 extends beyond the bearing support 39 and is tapered and keyed to be adapted to releasably mount a low speed or driven gear 44. Such outboard end of the driven shaft 41 is provided with a threaded portion 45 of reduced diameter and a nut 46 and washer 47 threaded on the portion 45 retain the driven gear 44 on the driven shaft 41. The outboard portion of the intermediate shaft 37 which projects beyond the bearing support 39 is similarly tapered and keyed to releasably retain an intermediate pinion 48 that is held in place by a nut 49 threaded on a threaded extending portion of the intermediate shaft 37.

A sheet metal cover 50 that is removably secured to a flange 51 of the casing 23 by screws as shown, forms a closure for the meshing intermediate pinion 48 and low speed driven gear 44. The intermediate pinion and driven gear may comprise a set of change speed gears. That is, any of a plurality of pairs of intermediate pinions and low speed gears can be selectively applied to the intermediate shaft 37 and the driven shaft 41, respectively, to vary the reduction as desired.

A rotor 51 of a tachometer generator assembly 52 is mounter on an inwardly extending outboard portion of the intermediate shaft 37 and cooperates with stator rings 53 of the generator assembly 52 which are mounted on the partition 33. A pair of leads 54 conducts the generated signal current produced by the tachometer generator assembly 52 to a coupling control 55 which provides a controlled exciting current for the rotary field coil 24 through leads 56 which connect to the brush assemblies 27. The control for the eddy current coupling 19 also includes a control station 57 having push button on and off switches 58 and 59, respectively, and a control rheostat 60.

In operation, the normal rotation of the rotor assembly 15 of the driving motor 10 is imparted to the driving rotor 18 of the eddy current coupling 19 through the hollow drive shaft 16 upon which the rotor assembly 15 and the driving rotor 18 are both mounted. In the known manner, the transmission of torque from the driving rotor 18 to the driven rotor 30 of the eddy current coupling 19 is dependent upon the magnetic field induced by the exciting field coil 24 within the driving rotor 18, and therefore, the speed of driven rotor 30 relative to the driving rotor 18 is dependent upon the exciting current supplied to the field coil 24. A reduction in the exciting current supplied to the field coil results in a reduction in the strength of the magnetic field thereby increasing the slip between the driving and driven rotors 18 and 30, respectively, with a consequent reduction in speed of the latter. Conversely, an increase in the exciting current supplied to the field coil 24 results in a decrease in the slip and an increase in the speed of the driven rotor 30. The speed imparted to the driven rotor 30 of the eddy current coupling 19 is transmitted through the quill shaft 31 and the high speed pinion 36 formed thereon. The meshing high speed pinion 36 and the intermediate gear 40 perform the first constant ratio reduction in speed. The speed is again reduced through the meshing intermediate pinion 48 and low speed gear 44 thereby imparting to the driven output shaft 41 the speed which is desired and preselected. As previously indicated, the intermediate pinion and low speed gear may be removed and replaced by cooperating gears having a different reduction ratio so that the range within which the speed of the output shaft 41 can be varied and controlled may be changed as desired.

A stepless variation in the rate of operation of the power drive is obtained by regulating the supply of exciting current to the field coils 24. The control for the eddy current coupling 19 is well known in the art and the details thereof form no part of the present invention. Generally, the control 55 provides direct current for excitation of the field coil 24 and further provides, in conjunction with the tachometer generator assembly 52, automatic speed control. The control 55 rectifies an alternating current supply for the eddy current coupling 19 and reference voltage is established at a level depending upon the setting of the control rheostat 60. The control rheostat 60 is set for the desired speed and may be calibrated in terms of the driven shaft speed. The rectified voltage is fed through the leads 56, the brush assemblies 27, the collector rings 26 and the leads 25 to the field coil 24. The speed of the intermediate shaft 37 is directly related to the coupling output speed, and the tachometer generator assembly 52 produces an output voltage directly proportional to the speed of the intermediate shaft 37 and consequently directly proportional to the speed of the driven rotor 30. Any speed variation of the intermediate shaft 37 is reflected as a voltage change measured across the lead 54 of the tachometer generator assembly 52. The control 55 rectifies the alternating current voltage output of the tachometer generator 52 and this is matched with the reference voltage so that when the speed of the intermediate shaft 37 exactly matches the speed setting of the control rheostat 60, no differential control voltage exists to alter the exciting current fed by the control 55 to the field coil 24. Under changing speed conditions, the difference between the reference voltage and the generator voltage is utilized to change the excitation to the field coil 24, either by increasing or decreasing the excitation in the proper amount, so that the excitation provided to the field coil 24 is altered to reestablish the condition of equilibrium between the reference voltage and tachometer generator voltage. Since the speed of the driven shaft 41 is in known proportion to that of the intermediate shaft 37, it is a simple matter to relate the setting of the control rheostat 60 to the desired output speed of the driven shaft 41.

It will be seen that the power drive is an extremely compact and structurally rigid unit. The provision of a driven shaft which extends outwardly of the motor end of the housing, with the driving motor, the slip coupling and the reduction gearing disposed about the driven shaft, results in a power drive unit of reduced overall size. Furthermore, the long span between the independent supports of the driven shaft minimizes the effect of deflections in the supports for the driven shaft.

The coaxial mounting of the driving motor, the slip coupling and the high speed pinion is structurally rigid to hold constant the critical working gap between the driving and driven rotors of the slip coupling. That is, the assembled hollow drive shaft and driven rotor are supported by the end wall 13 and by the partition 22 of the housing, and the assembled driven rotor and quill shaft are supported by the partition 33 and the hollow drive shaft. The result is a structurally rigid assembly of driving motor, slip coupling and high speed pinion supported by the housing at three axially spaced positions.

Figure 2:
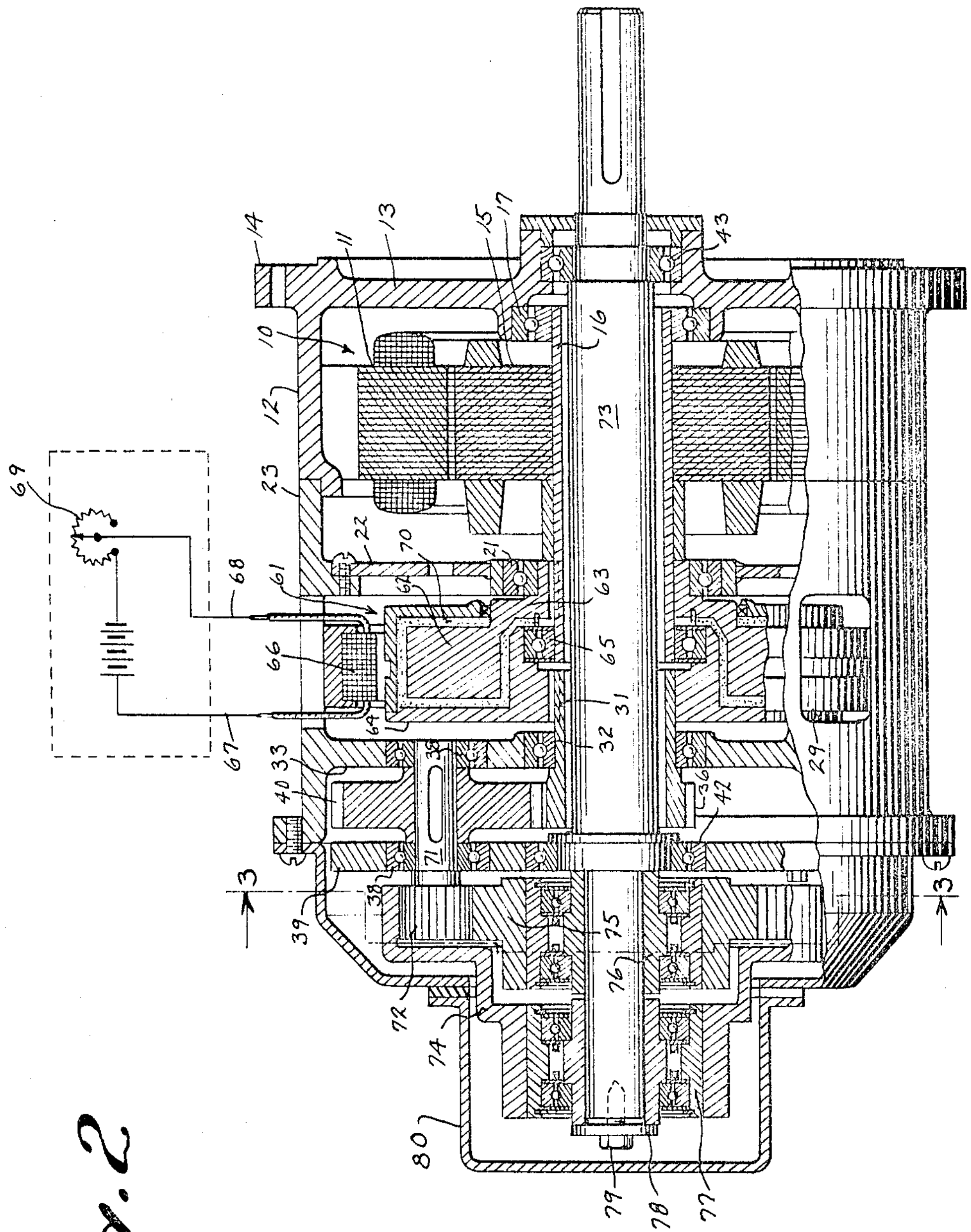
FIG. 2 is a vertical longitudinal view partly in section of another embodiment of a power drive which provides for two variable speed ranges.
Figure 3:
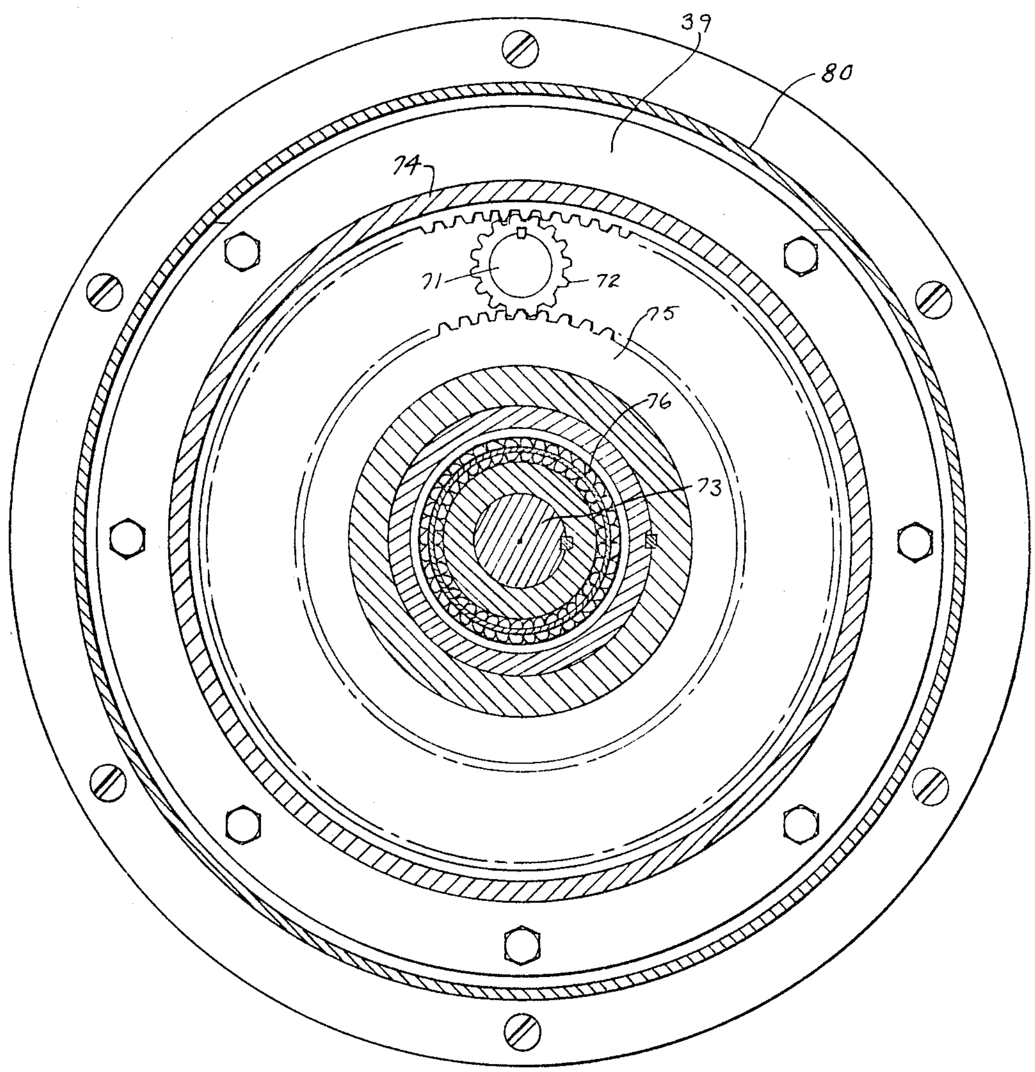
FIG. 3 is a view in vertical section taken in the plane of the line 3—3 of FIG. 2.

In the embodiment of FIGS. 2 and 3, there is provided a high and low speed range within which the speed is variable by control of an electromagnetic slip coupling. In FIGS. 2 and 3 like numerals have been used to designate parts which are similar to those of the embodiment of FIG. 1 and a discussion of the embodiment of FIGS. 2 and 3 will be confined to the differences which exist between the two embodiments. Referring to FIGS. 2 and 3, a magnetic particle coupling 61 is employed as an alternative to the eddy current coupling previously described. Again, the driving rotor 62 of the magnetic particle coupling 61 is provided with a hub portion 63 that is keyed to the hollow motor drive shaft 16 and is journaled in a bearing 21 provided in the partition 22. The driving motor 10 is an A.C. induction motor provided with standard reversing controls. The driven rotor 64 of the magnetic particle coupling 61 is keyed to the quill shaft 31 and is further supported on a sealed bearing 65 the inner race of which is mounted upon the hollow drive shaft 16. A stationary field assembly including a field coil 66 is secured to the inner periphery of the casing 23 and receives its excitation through a lead 67, connected to one side of a D.C. source, and a lead 68 connected to a speed control rheostat 69 which is connected in series with the D.C. source. The working gap between the driving rotor 62 and the driven rotor 64 of the coupling 61 is filled with magnetic particles 70 and the gap between the rotors is suitably sealed from the exterior.

The intermediate gear 40, which meshes with the high speed pinion 36 formed on the quill shaft 31, is mounted on an intermediate shaft 71 having an intermediate pinion 72 secured thereto on an outboard portion of the intermediate shaft 71 thereon. The intermediate pinion 72 is in continuous meshing engagement with a pair of concentric driven gears disposed about an extending portion of a driven shaft 73 journaled in the bearings 42 and 43. Specifically, the pinion 72 meshes with a low speed gear 74 having internal gear teeth and a second low speed gear 75 having external gear teeth. The second low speed gear 75 is keyed to the outer race of a one way clutch 76, preferably of the sprag type, the inner race of which is keyed to the driven shaft 73. A similar one way clutch 77 mounts the first low speed gear 74 to the driven shaft 73 and both clutches 76 and 77 are axially limited by a washer 78 held in place by a screw 79 received in the end of the driven shaft 73. The one way clutches 76 and 77 are mounted on the driven shaft 73 so that the free running direction of both is the same relative to the driven shaft 73. A sheet metal cover 80, removably secured to the casing 23 by screws, completes the housing.

Control of the speed of the driven rotor 64 of the magnetic particle couplings 61 relative to the driving rotor 62, is obtained through control of the excitation of the field coil 66. The magnetic flux field established by excitation of the field coil 66 aligns the magnetic particle 70 in the gap between the driving and driven rotors 62 and 64, respectively, and it is the aligned magnetic particles 70 which transmits torque between the driving and driven rotors. Generally, the greater the exciting current, the less will be the slip between the driving and driven rotors 62 and 64, respectively, and the greater will be the speed of the driven rotor 64. The converse is also true. The speed of the driven rotor 64 for a given speed of the driving rotor 62 may be preselected by setting the control rheostat 69 which establishes the proper exciting current to yield the preselected speed. The speed of the intermediate shaft 71 is, therefore, varied by proper control of the magnetic particle couplings 61.

Depending upon the direction of rotation of the rotor assembly 15 of the reversible motor 10, either the first or second low speed gears 74 and 75, respectively, will furnish the final reduction in speed to the driven shaft 73. Assuming that the hollow motor drive shaft 16 and, consequently, the coaxial quill shaft 31 are driven in a counterclockwise direction as viewed in FIG. 3, the one way clutch 77 which mounts the first low speed gear 74 on the driven shaft 73 will be free running and the first driven gear 74 will idle in a clockwise direction. However, the one way clutch 76 which mounts the second low speed gear 75 to the driven shaft 73 will engage and will cause the driven shaft 73 to rotate in a counterclockwise direction. If the motor 10 is then reversed to rotate in a clockwise direction, the one way clutch 76 is free running clockwise and the clutch 77 which mounts the first low speed gear 74 engages thereby driving the driven shaft 73 in a counterclockwise direction through the first low speed gear 74. It will be appreciated, therefore, that by selecting the direction for the reversible motor 10, one of two power paths to the driven shaft 73 may be selected and that the two power paths have different maximum and minimum speeds. Within each of the two speed ranges, the speed may be varied by control of the slip in the magnetic particle coupling 61. The provision of two speed ranges within which the speed is variable as desired provides greater efficiency in the lower speed range than is possible through the use of a single speed range.

While the power drive of this invention has been shown with a magnetic particle coupling and eddy current coupling, other forms of electromagnetic slip couplings may be employed with commensurate results. Furthermore, the control for the eddy current type slip coupling need not include a tachometer generator assembly for accurate speed control. That is, a normal adjustable exciting current control which may be set for a given speed can be employed although this will result in some reduction in the accuracy of the selected speed.

It is claimed:

1. In a variable speed power drive, the combination comprising: a housing; an electric motor having a hollow motor drive shaft journaled in said housing; an electromagnetic slip coupling including torque transmitting driving and driven rotors that are rotatable relative to each other and electromagnetic means on one of said rotors reacting on the other of said rotors to impart the torque transmitting function thereto, said driving rotor being secured about said hollow drive shaft for rotation in response to said motor; a quill shaft journaled in said housing coaxial with and axially spaced from said hollow drive shaft, said quill shaft mounting said driven rotor for rotation therewith; a pinion on said quill shaft; an intermediate shaft journaled for support in said housing in parallel spaced relationship with said hollow drive shaft and said quill shaft, the ends of said intermediate shaft projecting beyond its supports in said housing; an intermediate gear within said housing and affixed to said intermediate shaft in meshing engagement with said pinion; a driven output shaft journaled in said housing and extending through said quill shaft and said hollow drive shaft and outwardly of said housing at each end thereof; a pair of meshing gears respectively removably mounted on adjacent projecting ends of said intermediate and output shafts and forming one of a plurality of sets change gears having different gear ratios; a cover removably applied to said housing to form an enclosure for said last named pair of gears and for said projecting ends of said intermediate and output shafts; a tachometer generator having its stator secured within said housing and its rotor secured to an opposite projecting end of said intermediate shaft, said tachometer generator adapted to produce an output signal proportional to the speed of said intermediate shaft; and means for modifying and regulating the strength of said electromagnetic means to vary the speed of said driven output shaft, such means being responsive to the output signal of said tachometer generator to maintain a selected speed for said driven output shaft.

2. In a variable speed power drive, the combination comprising: a housing, an electric motor having a hollow drive shaft journaled at one end in said housing; an electromagnetic slip coupling including a driving rotor and a driven rotor rotatable relative to each other, said driving rotor including a hub portion that is secured about said hollow drive shaft and journaled in said housing for rotation of said driving rotor in response to said motor; a quill shaft journaled in said housing coaxial with and axially spaced from said hollow drive shaft, said quill shaft mounting said driven rotor for rotation therewith and said driven rotor including a portion concentric about the other end of said hollow drive shaft; a bearing mounted about said other end of said hollow drive shaft and mounting such portion of said driven rotor; a gear on said quill shaft; a driven output shaft journaled in said housing and extending through said quill shaft and said hollow drive shaft, one end of said output shaft extending beyond said housing at the motor end thereof; and speed change gearing in meshing engagement with said first named gear and drivingly connected with the other end of said output shaft.

3. In a variable speed power drive, the combination comprising: a housing; a reversible electric motor having a hollow motor drive shaft journaled in said housing, an electromagnetic slip coupling including a driving rotor and a driven rotor rotatable relative to each other, said driving rotor being secured about said hollow drive shaft for rotation in response to said motor; a quill shaft journaled in said housing coaxial with and axially spaced from said hollow drive shaft, said quill shaft mounting said driven rotor for rotation therewith; a high speed pinion on said quill shaft; an intermediate shaft journaled in said housing in parallel spaced relationship with said hollow drive shaft and said quill shaft, said intermediate shaft having inboard and outboard portions; an intermediate gear affixed to the inboard portion of said intermediate shaft in meshing engagement with said high speed pinion; an intermediate pinion affixed to the outboard portion of said intermediate shaft; a driven output shaft journaled in said housing and extending through said quill shaft and said hollow drive shaft; a pair of concentric driven gears disposed about said output shaft, the outer of said driven gears having interior gear teeth in meshing engagement with said intermediate pinion and the inner of said driven gears having exterior gear teeth in meshing engagement with said intermediate pinion; a pair of axially spaced one way clutches mounting said pair of driven gears to said output shaft, said clutches having the same free running direction relative to said output shaft whereby either one of two variable speed ranges for said output shaft may be selected by reversing the direction of said electric motor.

4. In a variable speed power drive, the combination comprising: a housing comprising a first casing having an exterior mounting wall, a second casing joined axially to said first casing and having a pair of spaced interior partitions, and a bearing support mounted on said second casing on an end thereof opposite said first casing; an electric motor having a hollow motor drive shaft journaled at one end in said wall and extending through a first of said partitions; an electromagnetic slip coupling disposed between said partitions and including torque transmitting driving and driven rotors that are rotatable relative to each other, said driving rotor having a hub portion secured about said hollow drive shaft and journaled in said first partition for rotation of said driving rotor in response to said motor; an antifriction bearing mounted about the other end of said hollow drive shaft; a quill shaft journaled in the second partition coaxial with and axially spaced from said hollow drive shaft, said quill shaft mounting said driven rotor for rotation therewith, said driven rotor being further supported on said antifriction bearing; a high speed pinion on said quill shaft and disposed between said second partition and said bearing plate; an intermediate shaft journaled in said second partition and said bearing support in parallel relationship with said quill shaft and said hollow drive shaft, said intermediate shaft having inboard and outboard portions; an intermediate gear secured to said inboard portion of said intermediate shaft in meshing engagement with said high speed pinion; a driven output shaft journaled in said bearing support and said wall of said first casing extending through said quill shaft and said hollow drive shaft, said driven output shaft having an outboard portion extending beyond said bearing support; a pair of mating gears arranged for respective removable application to the outboard portion of said intermediate shaft and the outboard portion of said driven output shaft; and a cover removably applied to said housing to form an enclosure for said last named pair of gears.

5. A variable speed power drive in accordance with claim 4 including electromagnetic means on one of said rotors and reacting on the other of said rotors to impart the torque transmitting function thereto, a tachometer generator having its stator mounted on said second partition and its rotor secured to said intermediate shaft, said tachometer generator adapted to produce an output signal proportional to the speed of said intermediate shaft, and means for modifying and regulating the strength of said electromagnetic means to vary the speed of said driven output shaft, such means being responsive to the output signal of said tachometer generator to maintain a selected speed for said driven output shaft.

6. In a variable speed power drive, the combination comprising: a housing comprising a first casing having an exterior mounting wall, a second casing joined axially to said first casing and having a pair of spaced interior partitions, and a bearing support mounted on said second casing on an end thereof opposite said first casing; a reversible electric motor having a hollow motor drive shaft journaled at one end in said wall and extending through a first of said partitions; an electromagnetic slip coupling disposed between said partitions and including torque transmitting driving and driven rotors that are rotatable relative to each other, said driving rotor having a hub portion secured about said hollow drive shaft and journaled in said first partition for rotation of said driving rotor in response to said motor; an antifriction bearing mounted about the other end of said hollow drive shaft; a quill shaft journaled in the second partition coaxial with and axially spaced from said hollow drive shaft, said quill shaft mounting said driven rotor for rotation therewith, said driven rotor being further supported on said antifriction bearing; a high speed pinion on said quill shaft and disposed between said second partition and said bearing plate; an intermediate shaft journaled in said second partition and said bearing support in parallel relationship with said quill shaft and said hollow drive shaft, said intermediate shaft having inboard and outboard portions; an intermediate gear secured to said inboard portion of said intermediate shaft in meshing engagement with said high speed pinion; a driven output shaft journaled in said bearing support and said wall of said first casing and extending through said quill shaft and said hollow drive shaft, said driven output shaft having an outboard portion extending beyond said bearing support; a pair of concentric driven gears disposed about said output shaft, the outer of said driven gears having interior gear teeth in meshing engagement with said intermediate pinion and the inner of said driven gears having exterior gear teeth in meshing engagement with said intermediate pinion; a pair of axially spaced one way clutches mounting said pair of driven gears to said output shaft, said clutches having the same free running direction relative to said output shaft whereby either one of two speed ranges for said output shaft may be obtained by selecting the direction of rotation of said reversible motor; and means for varying the rate of relative rotation between said driving and driven rotors to thereby effect a variation in the rate of rotation of said output shaft within each of said two speed ranges.

References Cited by the Examiner

UNITED STATES PATENTS 2,718,602 9/1955 Landis ------------ 310—99 X

MAX L. LEVY, *Primary Examiner.*

DAVID X. SLINEY, *Examiner.*